US008718071B2

(12) United States Patent
Li et al.

(10) Patent No.: US 8,718,071 B2
(45) Date of Patent: May 6, 2014

(54) METHOD TO PASS VIRTUAL LOCAL AREA NETWORK INFORMATION IN VIRTUAL STATION INTERFACE DISCOVERY AND CONFIGURATION PROTOCOL (75) Inventors: Yizhou Li, Nanjing (CN); Yingjie Gu, Nanjing (CN); T. Benjamin Mack-Crane, Downers Grove (IL); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 74 days.

(21) Appl. No.: 13/229,163

(22) Filed: Sep. 9, 2011

(65) Prior Publication Data
US 2012/0063363 A1 Mar. 15, 2012

Related U.S. Application Data (60) Provisional application No. 61/430,837, filed on Jan. 7, 2011, provisional application No. 61/381,808, filed on Sep. 10, 2010.

(51) Int. Cl.
H04L 12/28 (2006.01)
(52) U.S. Cl.
USPC ... 370/397; 370/399; 370/395.3; 370/395.53; 370/401
(58) Field of Classification Search
USPC ............ 370/397, 399, 395.3, 395.31, 395.53, 370/401
See application file for complete search history.

(56) References Cited

U.S. PATENT DOCUMENTS

| 7,385,973 | B1 * | 6/2008 | Johnson et al. ............... 370/389 |
|---|---|---|---|
| 7,675,890 | B2 | 3/2010 | Wang |
| 7,710,985 | B2 | 5/2010 | Nozue et al. |
| 7,764,688 | B2 | 7/2010 | Rabie et al. |
| 8,149,834 | B1 | 4/2012 | Nielsen et al. |
| 2002/0003801 | A1 | 1/2002 | Hwa et al. |
| 2002/0009084 | A1 | 1/2002 | Kalkunte |
| 2003/0120763 | A1 | 6/2003 | Volpano |
| 2004/0081180 | A1 | 4/2004 | De Silva et al. |
| 2005/0053046 | A1 | 3/2005 | Wang |
| 2005/0084092 | A1 | 4/2005 | Rice |
| 2005/0094567 | A1 | 5/2005 | Kannan et al. |

(Continued)

FOREIGN PATENT DOCUMENTS

| CN | 1852234 A | 10/2006 |
|---|---|---|
| CN | 1878133 A | 12/2006 |
| CN | 101064682 A | 10/2007 |

OTHER PUBLICATIONS

Office Action dated Nov. 26, 2012, 32 pages, U.S. Appl. No. 13/630,400, filed Sep. 28, 2012.

(Continued)

Primary Examiner — Alvin Zhu
(74) Attorney, Agent, or Firm — Conley Rose, P.C.; Grant Rodolph; Rayhao Chung (57) ABSTRACT An apparatus comprising an edge virtual bridging (EVB) bridge, and an EVB station coupled to the EVB bridge, wherein the EVB station is configured to send to the EVB bridge a virtual station interface (VSI) discovery and configuration protocol (VDP) request comprising a filter information (info) field without specifying a virtual local area network (VLAN) identifier (ID), and wherein the EVB bridge is configured to send a VLAN ID (VID) to the EVB station in a second filter info field in a VDP response to the VDP request.

26 Claims, 8 Drawing Sheets

(56) References Cited

U.S. PATENT DOCUMENTS

| | | | |
|---|---|---|---|
| 2005/0261970 A1 | 11/2005 | Vucina et al. | |
| 2006/0039390 A1 | 2/2006 | Boyd et al. | |
| 2006/0067335 A1 | 3/2006 | Maya et al. | |
| 2006/0274744 A1 | 12/2006 | Nagai et al. | |
| 2007/0097968 A1* | 5/2007 | Du | 370/389 |
| 2007/0140263 A1 | 6/2007 | Mitome et al. | |
| 2007/0223493 A1 | 9/2007 | Sridhar et al. | |
| 2008/0097858 A1 | 4/2008 | Vucina et al. | |
| 2008/0117902 A1 | 5/2008 | Vinneras | |
| 2008/0137557 A1 | 6/2008 | Nozue et al. | |
| 2008/0199180 A1 | 8/2008 | Yang et al. | |
| 2008/0270588 A1 | 10/2008 | Sultan et al. | |
| 2008/0291928 A1 | 11/2008 | Tadimeti et al. | |
| 2008/0298274 A1 | 12/2008 | Takashige et al. | |
| 2009/0067436 A1 | 3/2009 | Gast et al. | |
| 2009/0122800 A1 | 5/2009 | Umayabashi et al. | |
| 2009/0279558 A1 | 11/2009 | Davis et al. | |
| 2009/0304380 A1 | 12/2009 | Sadananda et al. | |
| 2010/0040060 A1 | 2/2010 | Gleeson | |
| 2010/0054129 A1 | 3/2010 | Kuik et al. | |
| 2010/0054251 A1 | 3/2010 | Lee et al. | |
| 2010/0142537 A1 | 6/2010 | Lee et al. | |
| 2010/0195492 A1 | 8/2010 | Haramatos et al. | |
| 2010/0232443 A1 | 9/2010 | Pandey et al. | |
| 2010/0287262 A1 | 11/2010 | Elzur | |
| 2010/0303083 A1 | 12/2010 | Belanger et al. | |
| 2011/0002346 A1 | 1/2011 | Wu | |
| 2011/0004877 A1 | 1/2011 | Wu | |
| 2011/0029734 A1 | 2/2011 | Pope et al. | |
| 2011/0035747 A1 | 2/2011 | Machida | |
| 2011/0058573 A1 | 3/2011 | Balakavi et al. | |
| 2011/0110266 A1 | 5/2011 | Li et al. | |
| 2011/0122784 A1 | 5/2011 | Ananthanarayanan et al. | |
| 2011/0202485 A1 | 8/2011 | Cutler et al. | |
| 2011/0271277 A1 | 11/2011 | Hussain et al. | |
| 2011/0299414 A1 | 12/2011 | Yu et al. | |
| 2011/0317558 A1 | 12/2011 | Siddam et al. | |
| 2012/0016970 A1 | 1/2012 | Shah et al. | |
| 2012/0155466 A1 | 6/2012 | Davis | |
| 2012/0257496 A1 | 10/2012 | Lattmann et al. | |

OTHER PUBLICATIONS

Office Action dated Dec. 7, 2012, 19 pages, U.S. Appl. No. 13/625,573, filed Sep. 24, 2012.

Kashyap, V., et al., "Automating Virtual Machine Network Profiles," Proceedings of the Linux Symposium, Ontario, Canada, Jul. 13-16, 2010, 8 pages.

"VSI Discovery and Configuring—Working Draft: Definitions, Semantics, and State Machines," 802.1 Qbg Presentation, Version 00, Mar. 16, 2010, pp. 6-32.

Bg-Sultan-PCP-in-VDP-RSP-Clause41-0111-v01, P802.1Qbg/D1.3, Feb. 2011, 5 pages.

Foreign Communication From a Related Counterpart Application, PCT Application No. PCT/CN2011/079556, International Search Report dated Dec. 22, 2011, 4 pages.

Foreign Communication From a Related Counterpart Application, PCT Application No. PCT/CN2011/079554, International Search Report dated Dec. 22, 2011, 3 pages.

"Virtual Bridged Local Area Networks—Amendment XX: Edge Virtual Bridging," Draft Standard for Local and Metropolitan Networks, P802.1Qbg/D1.7, IEEE, Aug. 22, 2011, 179 pages.

"Virtual Bridged Local Area Networks—Amendment XX: Edge Virtual Bridging," Draft Standard for Local and Metropolitan Networks, P802.1Qbg/D1.3, IEEE, Dec. 20, 2010, 171 pages.

"Virtual Bridged Local Area Networks—Amendment XX: Edge Virtual Bridging," Draft Standard for Local and Metropolitan Networks, P802.1Qbg/D1.2, IEEE, Oct. 21, 2010, 83 pages.

"Virtual Bridged Local Area Networks—Amendment XX: Edge Virtual Bridging," Draft Standard for Local and Metropolitan Networks, P802.1Qbg/D1.4, IEEE, Mar. 10, 2011, 172 pages.

"Virtual Bridged Local Area Networks—Amendment XX: Edge Virtual Bridging," Draft Standard for Local and Metropolitan Networks, P802.1Qbg/D1.5, IEEE, Mar. 31, 2011, 166 pages.

"Virtual Bridged Local Area Networks—Amendment XX: Edge Virtual Bridging," Draft Standard for Local and Metropolitan Networks, P802.1Qbg/D1.6, IEEE, Jun. 30, 2011, 206 pages.

"Virtual Bridged Local Area Networks," IEEE Standard for Local and Metropolitan Area Networks, IEEE Standard 802.1Q, 2005, 303 pages.

"Media Access Control (MAC) Bridges and Virtual Bridge Local Area Networks," IEEE Standard for Local and Metropolitan Area Networks, IEEE Computers Society, IEEE Std. 802.1Q-2011, Aug. 31, 2011, 1365 pages.

Office Action dated Jun. 3, 2013, 11 pages, U.S. Appl. No. 13/625,573, filed Sep. 24, 2012.

Recio, R., et al., "Ethernet Virtual Bridging Automation Use Cases," IBM, 2010, 10 pages.

Li, Y., et al., "VLAN info in VDP," Powerpoint, Sep. 13, 2010, 13 pages.

Hewlett-Packard, IBM, "EVB Proposal for: Virtual Ethernet Port Aggregator, Edge Virtual Bridging TLV, Edge TLV Protocol, Multichannel, and VSI Discovery Protocol," Version 0, Rev 0.1, Mar. 15, 2010, 62 pages.

Office Action dated Apr. 2, 2013, 35 pages, U.S. Appl. No. 13/630,400, filed Sep. 28, 2012.

Foreign Communication From a Related Counterpart Application, PCT Application No. PCT/CN2011/079556, Written Opinion dated Dec. 22, 2011, 5 pages.

Foreign Communication From a Related Counterpart Application, PCT Application No. PCT/CN2011/079554, Written Opinion dated Dec. 22, 2011, 4 pages.

Foreign Communication From a Counterpart Application, European Application No. 11823093.7, Extended European Search Report dated Apr. 4, 2013, 10 pages.

Foreign Communication From a Counterpart Application, European Application No. 11823092.9, Extended European Search Report dated Mar. 28, 2013, 8 pages.

Office Action dated Jun. 14, 2013, 40 pages, U.S. Appl. No. 13/299,374, filed Sep. 9, 2011.

* cited by examiner

METHOD TO PASS VIRTUAL LOCAL AREA NETWORK INFORMATION IN VIRTUAL STATION INTERFACE DISCOVERY AND CONFIGURATION PROTOCOL

CROSS-REFERENCE TO RELATED APPLICATIONS

The present application claims the benefit of U.S. Provisional Patent Application No. 61/381,808 filed Sep. 10, 2010 by Yizhou Li, et al. and entitled "Method to Pass Virtual Local Area Network Information in Virtual Station Interface Discovery and Configuration Protocol," and U.S. Provisional Patent Application No. 61/430,837 filed Jan. 7, 2011 by Robert Sultan, et al. And entitled "Specifying Priority on a Virtual Server Interface Discovery Protocol Response," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data through the network. The nodes may include routers, switches, and/or bridges that transport the individual data frames or packets through the network. For example, the Institute of Electrical and Electronics Engineers (IEEE) 802.1Q compliant Ethernet switches forward data frames based on their learned or provisioned filtering database (FDB). As such, the frames can be forwarded based on an associated destination address (DA) and a virtual local area network (VLAN) identifier (VID). If the FDB does not comprise an entry that matches an incoming frame's DA and VID, the frame can be flooded to all the ports except the one on which the frame arrived. Accordingly, the data frames can be forwarded between the nodes in a single network (or domain) or in different networks (or domains).

SUMMARY

In one embodiment, the disclosure includes an apparatus comprising an edge virtual bridging (EVB) bridge, and an EVB station coupled to the EVB bridge, wherein the EVB station is configured to send to the EVB bridge a virtual station interface (VSI) discovery and configuration protocol (VDP) request comprising a filter information (info) field without specifying a virtual local area network (VLAN) identifier (ID), and wherein the EVB bridge is configured to send a VLAN ID (VID) to the EVB station in a second filter info field in a VDP response to the VDP request.

In another embodiment, the disclosure includes a server platform comprising a transmitter configured to send to a bridge a virtual station interface (VSI) discovery and configuration protocol (VDP) request message without specifying a virtual local area network (VLAN) identifier (ID), a receiver configured to receive from the bridge a VLAN ID in a VDP response message in response to the VDP request message, and a logic unit configured to associate the VLAN ID with a VSI.

In yet another embodiment, the disclosure includes a method implemented by at least one network component comprising sending from a virtual station a virtual station interface (VSI) discovery and configuration protocol (VDP) request that comprises a virtual local area network (VLAN) field to a bridge coupled to the virtual station via a VSI, and receiving at the virtual station a VDP response that comprises a VLAN ID that is mapped at the bridge to the VLAN field.

In yet another embodiment, the disclosure includes a network bridge comprising a receiver configured to receive from a network server a virtual station interface (VSI) discovery and configuration protocol (VDP) request message without specifying a virtual local area network (VLAN) identifier (ID), a transmitter configured to transmit to the network server a VLAN ID in a VDP response message in response to the VDP request message, and a logic unit configured to retrieve the VLAN ID based on an ID in the VDP request message.

In yet another embodiment, the disclosure includes a method implemented by at least one network component comprising receiving at a bridge from a virtual station coupled to the bridge via a VSI a virtual station interface (VSI) discovery and configuration protocol (VDP) request that comprises a virtual local area network (VLAN) field, and sending to the virtual station a VDP response that comprises a VLAN ID that is mapped at the bridge to the VLAN field.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A data center (DC) may comprise a plurality of bridges that are coupled to a plurality of servers and virtual machines (VMs). The bridges may bridge or forward data between the different servers and VMs, e.g., as described in IEEE 802.1Qbg for edge virtual bridging (EVB) (in draft D1.7 at the time of this disclosure), which is incorporated herein by reference. A plurality of VMs in a server platform coupled to a bridge may establish a plurality of virtual stations. A VM in a virtual station may communicate with a bridge in the DC via a virtual station interface (VSI). IEEE 802.1Qbg defines a VSI discovery and configuration protocol (VDP) TLV that may be sent from the server platform to a DC bridge and carry MAC/VLAN ID information for the virtual station. In clause 41 of the draft, a VDP communications protocol is described. VDP supports control communication between a server (or virtual station on the server) and a bridge to which the server is attached. The protocol supports the transmission of a VDP request from server to bridge, the reception and processing of the VDP request by the bridge, the transmission of a VDP response from bridge to server, and the reception and processing of the VDP response by the server. The purpose of the VDP is to bind or unbind a VSI and associated properties with a bridge port.

Disclosed herein is a system and methods for obtaining a VLAN ID associated with a VSI MAC Address from an adjacent bridge or an edge bridge via VDP. A server or virtual station may send a reserved VLAN ID value, e.g., a null VID (a zero value) or VLAN name and other information to the bridge. The bridge may then check its database or a network management database and respond with the associated VLAN ID. The station may send a VDP association request to obtain the VLAN ID for a MAC Address or VLAN from the bridge. The bridge may then return a VDP association successful response that indicates the VLAN ID. If a network administrator wants to change a VLAN ID number due to a management reason, the bridge may send a message to force the virtual station to associate with the new VLAN ID.

The terms Group ID, Service ID, and VLAN Name are used interchangeably throughout this disclosure and are treated as equivalent terms.

Figure 1:
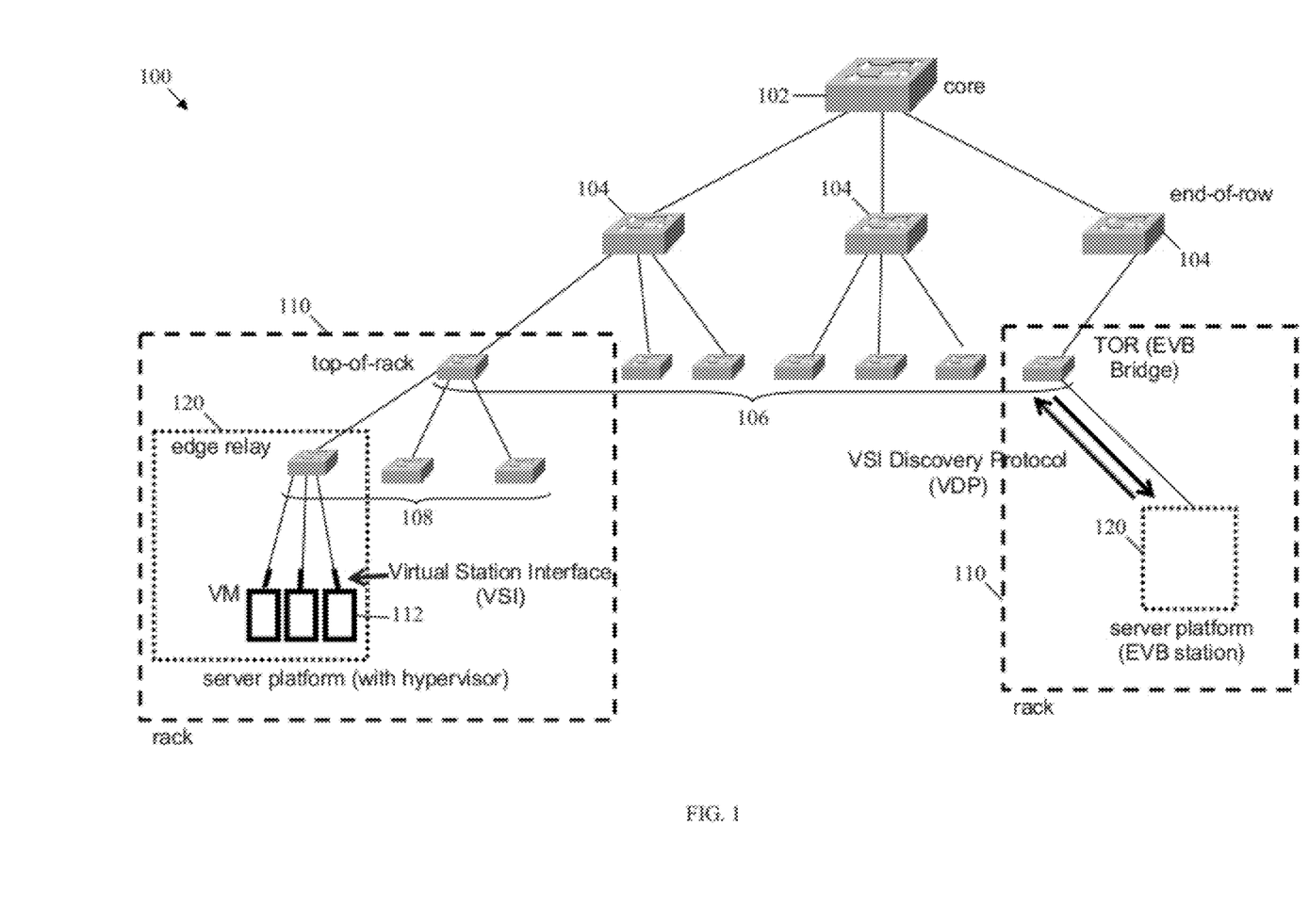
FIG. 1 is a schematic diagram of an embodiment of a data center network.

FIG. 1 illustrates an embodiment of a DC network 100, which may be located in one or more geographical locations. The DC Network 100 may be configured to allow communications between a plurality of data servers, which may also be coupled to or communicate with customers or external networks (not shown). The DC network 100 may comprise a plurality of interconnected network bridges comprising a core bridge 102 and a plurality of end-of-row (EOR) bridges 104 coupled to the core bridge 102. Each of the EOR bridges 104 may be coupled to one or more top-of-rack (TOR) bridges 106, which may be an EVB bridge based on IEEE 802.1Qbg. Each of the TOR bridges 106 may be coupled to a plurality of internal edge relays 108. The TOR bridge 106 and the coupled edge relays 108 may be located on a rack 110. Each edge relay 108 may also be coupled to a plurality of VMs 112, e.g., located in a server. The edge relay 108 and the coupled VMs 112 may be located on a server or server platform (controlled by a hypervisor) 120, which may be an EVB station IEEE 802.1Qbg. The components of the DC network 100 may be configured in a tree-like topology as shown in FIG. 1.

A VM 112 may communicate with the edge relay 108 via a VSI and the server or server platform 120 (or EVB station) may communicate with the TOR bridge 106 (or EVB bridge) via a physical link or logical channel and use VDP, e.g., as described in IEEE 802.1Qbg. The VMs 112 in different server platforms 120 or EVB stations may also exchange frames (e.g., MAC frames) via the corresponding TOR bridges 106, EOR bridges 104, and core bridge 102, for example over an established VLAN. Typically, a server platform 120 may be aware of the VID for each VSI of an associated VM 112. The VID assignments (VID values) may be locally assigned within the context of an area of the network connected to a group of server platforms 120 and their VMs 112. For example, the DC network 100 may comprise more than about 4094 VLANs, and be organized in rows of racks where VIDs are assigned locally in each row, and where the VMs 112 in the same VLAN may have different VIDs and the VMs 112 in different VLANs may have similar VIDs when the VMs are in different rows. The different VLANs may be assigned different VLAN service IDs (or Group IDs), which may be globally assigned values by the DC network 100. However, the VID value assigned to the VMs 112 within a VLAN in a particular row may be configured locally in that row.

Typically, a server management system at the server platform 120 (e.g., hypervisor) configures the VIDs for their VMs 112. As such, a server administrator may get the VIDs for his server platform 120 from a network administrator of the DC network 100, e.g., via out of band schemes or human interaction. This may require selecting VIDs based on the VMs' locations and complicate management. Instead, an improved VID assignment scheme may be implemented in the DC network 100. Specifically, a VID may be associated with a VSI (in a server platform 120) from an adjacent bridge, such as a TOR bridges 106 or EVB bridge, using VDP. The server platform 120 may first send the adjacent bridge a VID value of about zero and a VSI Type, Group ID or VLAN name. The bridge may then check a VSI Type database, Group ID database, or VLAN name database and return to the server a VID associated with the indicated VSI Type or Group ID. The exchange of VID, VSI Type, Group ID, and/or VLAN name values between the server platform 120 and the TOR bridge 106 may be achieved using a VDP TLV. This improved VID assignment scheme may better separate sever administration and network administration responsibilities and provide simpler and dynamic provisioning for bridge specific (local) VID to server.

Figure 2:
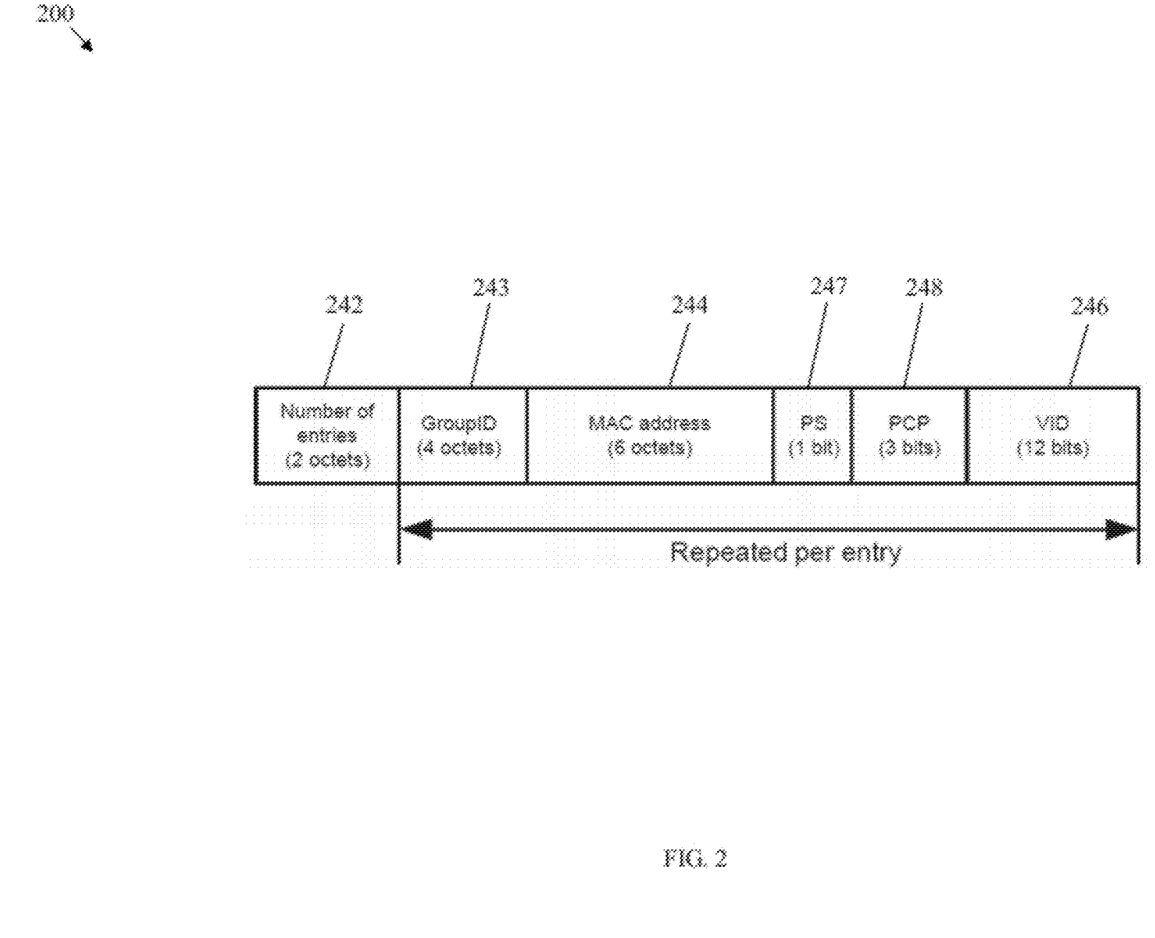
FIG. 2 is a schematic diagram of an embodiment of a filter info field in a VDP Type-Length-Value (TLV).

FIG. 2 illustrates an embodiment of a filter information (info) field 200 in a VDP TLV, which may be sent by the server platform 120, the TOR bridge 106, or both. The VDP TLV may be sent to exchange the VID, VSI Type, Group ID, and/or VLAN name values to assign one or more VIDs to one or more VSIs in the server platform 120. The VDP TLV may be configured as described in the IEEE 802.1Qbg and may comprise a plurality of fields accordingly. The fields may include a VSI Type ID field (e.g., that has a size of about three octets), a VSI Type Version field (e.g., that has a size of about one octet), a MAC/VLAN format field (e.g., that has a size of about one octet), and the filter info field 200 (e.g., that has a size of about M octets, M is an integer). The filter info field may also be referred to as a MAC/VLANs field, and the two terms may be used interchangeably herein. The IDs in the VSI Type ID field and the VSI Type Version field may be used to get VSI Type definition, including VLAN information. If the format is set to a determined value, e.g., to about four, in the MAC/VLAN format field, then the filter info field 200 may comprise a number of entries field 242 that indicates the number of repeated entries in the filter info field 200, and a GroupID field 241, a MAC Address field 244, and VID field 246 per each entry. The filter info field 200 may also comprise a Priority Code Point (PCP) Significant (PS) bit field 247 and a PCP bit field 248, both which may also be repeated per entry. The number of entries field 242 may comprise about two octets, the GroupID field 241 may comprise about four octets, the MAC Address field 244 may comprise about six octets, and the VID field 246 may comprise about 12 bits.

Alternatively, the filter info field 200 may have other formats (not shown). For instance, if the MAC/VLAN format field 200 in the VDP TLV is set to a determined value, e.g., to about one, then the filter info filed 200 may comprise only the number of entries field 242, and the PS bit field 247, the PCP bit field 248, and the VID field 246 per each entry. If the MAC/VLAN format field 200 in the VDP TLV is set to a determined value, e.g., to about two, then the filter info filed 200 may comprise only the number of entries field 242, and the MAC Address field 244, the PS bit field 247, the PCP bit field 248, and the VID field 246 per each entry. If the MAC/VLAN format field 200 in the VDP TLV is set to a determined value, e.g., to about three, then the filter info filed 200 may comprise only the number of entries field 242, and the GroupID filed 241, the PS bit field 247, the PCP bit field 248, and the VID field 246 per each entry.

From a perspective of a system administrator (e.g., a server or VM administrator), the VLAN information may comprise VLAN names or VLAN types, which may be values or indexes. Such information may be used by the system administrator to group stations (server platforms 120) or VMs (VMs 112) in the network. For example, a plurality of VMs 112 in one or multiple server platforms 120 may be all web servers that are grouped and assigned one VLAN value (e.g., a value of "web-server") in the data network. From a perspective of a network administrator (e.g., a DC administrator), the VLAN information may comprise a VLAN ID, which may be an assigned value used in a customer tag (C-tag) field in a transmitted Ethernet frame. The VLAN ID value may be used for filtering or implementing network policies, e.g., for Layer 2 (L2) traffic.

Allowing a bridge (TOR bridge 106) to provision and send VLAN IDs to an adjacent or coupled server (server platform 120) may be desirable since the VLAN ID may be a network relevant parameter under the control of the network administrator. The system administrator may need to obtain the correct value of the VLAN ID for provisioning the corresponding VSI properly but may not care about the specific value of the VLAN ID. The system administrator may need to perform server planning based on logical partition or service, e.g., using the VLAN name "web-server" but may not care about the specific value assigned to a VLAN ID. On the other hand, the network administrator may be aware of the specific value of a VLAN ID. For example, the network administrator may know that the VLAN named "web-server" uses a VLAN ID value of 10. The network administrator may not want to indicate the VLAN ID in a VSI Type definition. For instance, the network administrator may not want to disclose the VLAN ID information directly to a VM manager or may want to change the VLAN ID after some time. However, the network administrator may include the VLAN name in the VSI Type definition to a VM. The VLAN name may also be referred to as a service name, and the two terms may be used interchangeably herein.

Figure 3:
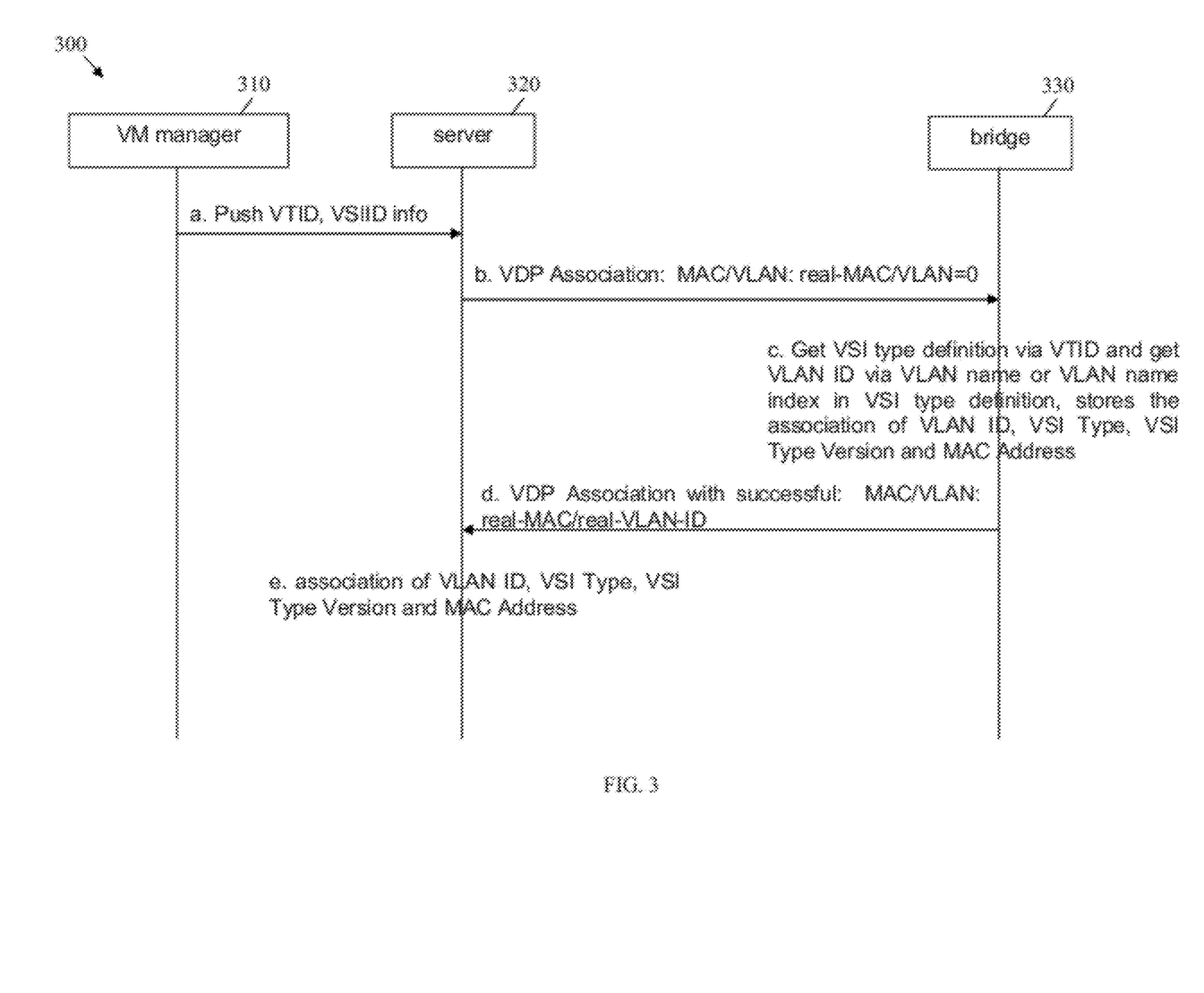
FIG. 3 is a protocol diagram of an embodiment of a method for getting a VLAN ID.

FIG. 3 illustrates an embodiment of a method 300 for getting a VLAN ID. The method 300 may allow a VM manager 310 to obtain a VLAN ID assigned to a VLAN for a server (or station) 320 from a network (e.g., the DC network 100) via an adjacent bridge 330. For example, the VM manager 310 may manage a VM 112, the server 320 may correspond to a server platform 120, and the bridge 330 may correspond to a TOR bridge 106. The VM manager 310 and the server 320 may exchange a VSI Type (VTID) with the bridge 330 that maps the VTID to a corresponding VLAN ID.

At step a, the VM manager 310 may push VTID and VSI ID (VSIID) information or values to the server 320, e.g., in a VDP TLV 200. The VSI ID may indicate a VSI for a VM and the VSI Type may be associated with the traffic on the VSI. At step b, the server 320 may send a VDP request to the bridge 330. The VDP request may comprise MAC/VLAN information, e.g., in a MAC/VLANs field 240 in a VDP TLV 200. The MAC/VLANs field 240 may comprise a MAC Address field 244 indicating the MAC Address of a VM, and a VLAN ID field 246 set to about zero. The server 320 may also send the VTID and VSIID values to the bridge 330.

At step c, the bridge 330 may use the received VTID to get a VSI Type definition associated with the VTID (e.g., from the network management system or port profile database) and obtain a VLAN ID from the VSI Type definition. The bridge 330 may store the association of VLAN ID, VSI Type, VSI Type Version, MAC Address, or combinations thereof locally. At step d, the bridge 330 may return to the server 320 a VDP response that indicates a successful association. The VDP response may comprise MAC/VLAN information, e.g., in a MAC/VLANs field 240 in a VDP TLV 200. The MAC Address field 244 and the VLAN ID field 246 in the MAC/VLANs field 240 may comprise the MAC Address and VLAN ID associated with the VSI, respectively. At step e, the server 320 may store the association of VLAN ID, VSI Type, VSI Type Version, MAC Address, or combinations thereof locally, which may be available to the VM manager 310.

Figure 4:
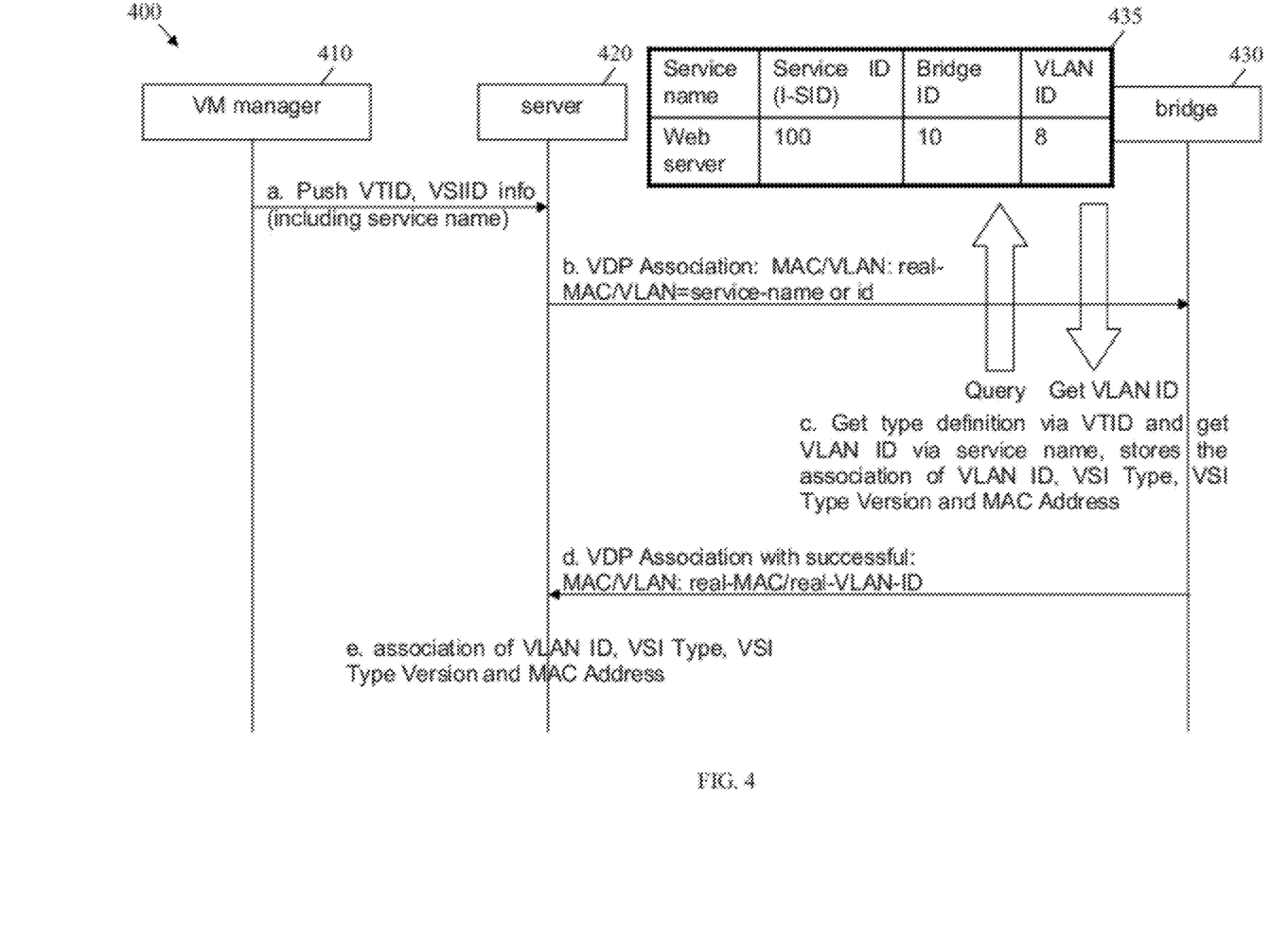
FIG. 4 is a protocol diagram of another embodiment of a method for getting a VLAN ID.

FIG. 4 illustrates an embodiment of another method 400 for getting a VLAN ID. The method 400 may allow a server (or station) 420 managed by a VM manager 410 to exchange a VLAN name or service name (e.g., a character string meaningful to human administrators) with a bridge 430 that maps the service name to a corresponding VLAN ID associated with the service name in the network. The VM manager 410, the server 420, and the bridge 430 may be similar to the VM manager 310, the server 320, and the bridge 330, respectively. At step a, the VM manager 410 may push VTID and VSIID information (e.g., including a service name) to the server 420. At step b, the server 420 may send a VDP request to the bridge 430 that comprises MAC/VLAN information, including the MAC Address of a VM or for a VSI, and the service name corresponding to the service. The VDP request may be sent in a new VDP TLV that indicates the service name. The server 420 may also send the VTID and VSIID information to the bridge 430.

At step c, the bridge 430 may send a query to the network or network management system to get a VLAN ID associated with the service name. The bridge 430 may use the received VTID to get a VSI Type definition associated with the VTID from an association table 435 or database in the network, and use the service name (e.g., "web server") to obtain an associated VLAN ID from the network. The bridge 430 may store the association of VLAN ID, VSI Type, VSI Type Version, MAC Address, or combinations thereof locally, e.g., in an association table. At step d, the bridge 430 may return a VDP response that indicates a successful association. The MAC Address field 244 and the VLAN ID field 246 in the MAC/VLANs field 240 may comprise the MAC Address and VLAN ID associated with the VM or VSI, respectively. At step e, the server 420 may store the association of VLAN ID, VSI Type, VSI Type Version, MAC Address, or combinations thereof locally, which may be available to the VM manager 410.

Figure 5:
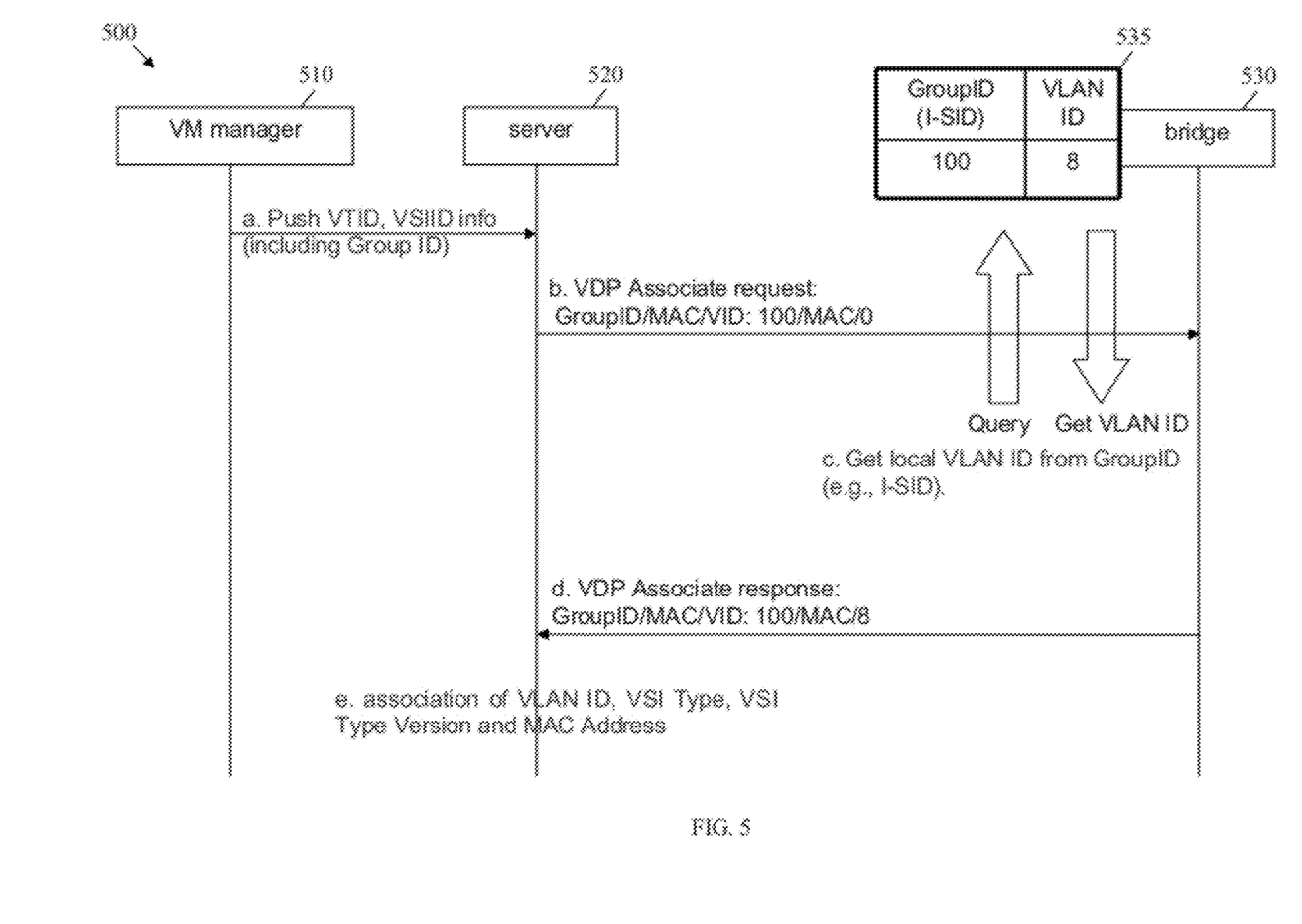
FIG. 5 is a protocol diagram of another embodiment of a method for getting a VLAN ID.

FIG. 5 illustrates an embodiment of another method 500 for getting a VLAN ID. The method 500 may allow a server (or station) 520 managed by a VM manager 510 to exchange a Group ID (or VLAN service ID) with a bridge 530 that maps the Group ID to a corresponding VLAN ID associated with the Group ID in the network. The VM manager 510, the server 520, and the bridge 530 may be similar to the VM manager 310, the server 320, and the bridge 330, respectively. At step a, the VM manager 510 may push VTID and VSIID information (e.g., including a Group ID) to the server 520. At step b, the server 520 may send a VDP request, e.g., a VDP Associate request, to the bridge 530 that comprises a Group ID that indicates a service, a MAC Address associated with a VM or VSI, and a VID (VLAN ID) that is set to about zero. The Group ID may be sent in a Filter Info field in VDP TLV. The server 520 may also send the VTID and VSIID information to the bridge 530.

At step c, the bridge 530 may send a query to the network or network management system to get a VLAN ID associated with the Group ID. The bridge 530 may use the received Group ID to get a VLAN ID associated with the Group ID, e.g., a backbone service instance ID (I-SID) in an association table 535 or database in the network. At step d, the bridge 530 may return to the server 520 a VDP response, e.g., VDP Associate response, that comprises the Group ID for the service, the MAC Address associated with the VM or VSI, and the VLAN ID associated with the Group ID. At step e, the server 520 may store the association of VLAN ID, VSI Type, VSI Type Version, MAC Address, or combinations thereof locally, which may be available to the VM manager 510.

Figure 6:
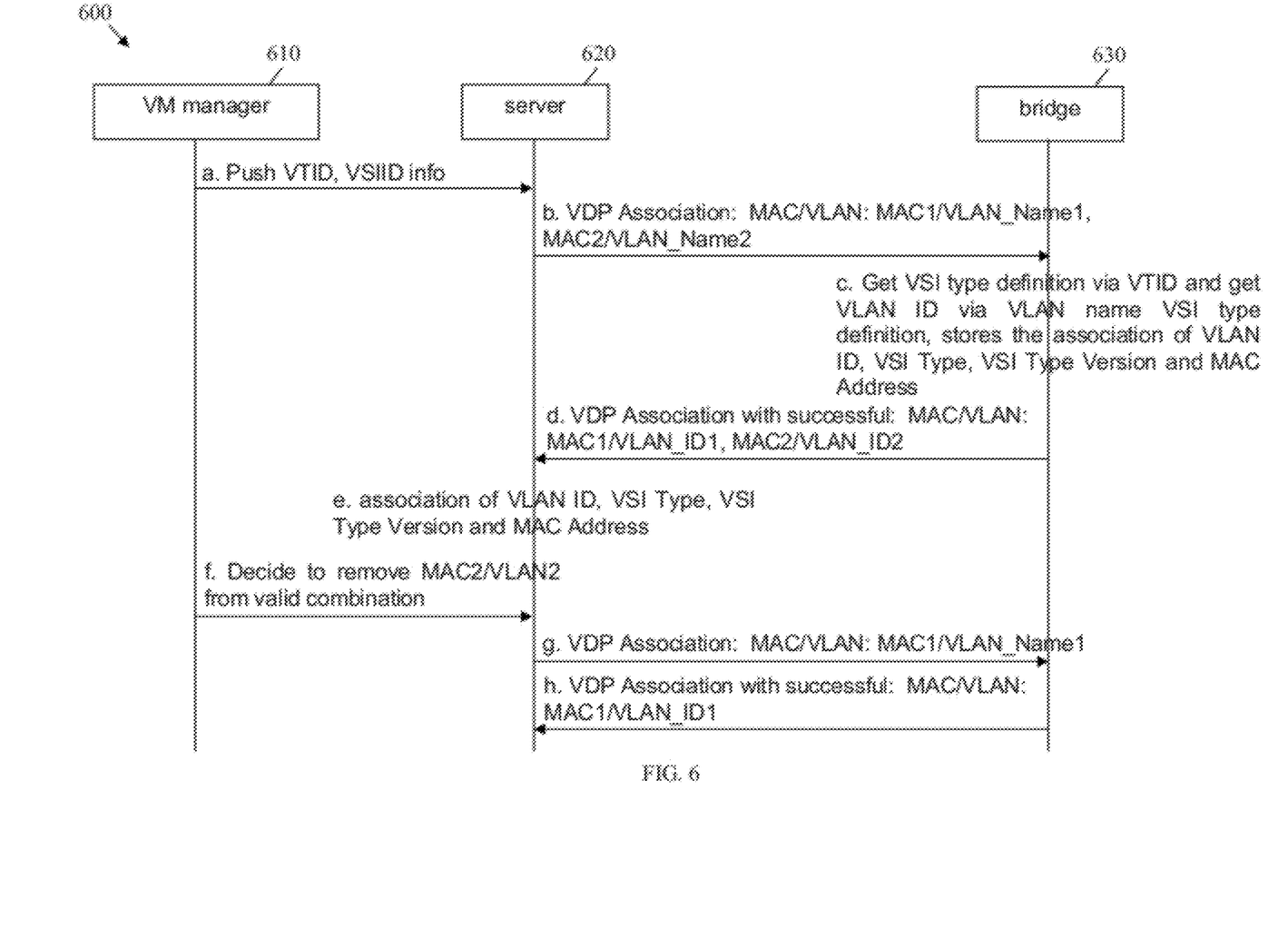
FIG. 6 is a protocol diagram of another embodiment of a method for getting a VLAN ID.

FIG. 6 illustrates an embodiment of another method 600 for getting a VLAN ID. The method 600 may allow a server (or station) 620 coupled to a VM manager 610 to exchange one or more VLAN names with a bridge 630 that maps each VLAN name to a corresponding VLAN ID associated with the VLAN name in the network. The VM manager 610, the server 620, and the bridge 630 may be similar to the VM manager 310, the server 320, and the bridge 330, respectively. At step a, the VM manager 610 may push VTID and VSIID information (e.g., including VLAN names, service names, or Group IDs) to the server 620, e.g., in a VDP TLV 200. At step b, the server 620 may send a VDP request to the bridge 630 that comprises MAC/VLAN information, including one or more MAC Addresses of corresponding VM(s) or VSI(s), and one or more corresponding VLAN names. The server 620 may also send the VTID and VSIID information to the bridge 630.

At step c, the bridge 630 may use the received VTID to get a VSI Type definition associated with the VTID (e.g., from the network) and use the VLAN name(s) to obtain the associated VLAN ID(s). The bridge 630 may store the corresponding associations of VLAN ID, VSI Type, VSI Type Version, MAC Address, or combinations thereof locally. At step d, the bridge 630 may return to the server 620 a VDP response that indicates a successful association. The VDP response may comprise MAC/VLAN information, including the provided MAC Addresses and associated VLAN IDs, e.g., in a MAC/VLANs field 240 in a VDP TLV 200. For example, the MAC Addresses and VLAN IDs may be included in one or more MAC Address fields 244 and VLAN ID fields 246, respectively, in the MAC/VLANs field 240. At step e, the server 620 may store the corresponding associations of VLAN ID, VSI Type, VSI Type Version, MAC Address, or combinations thereof locally, which may be available to the VM manager 610.

At step f, the VM manager 610 may decide to remove one or more MAC/VLAN ID pairs, e.g., in an association table at the server or station 620. For example, the VM manager 610 may remove a MAC/VLAN ID pair that corresponds to a removed VM or VSI and that has become invalid. The VM manager 610 may instruct the server 620 to remove the MAC/VLAN ID pair. At step g, the server 620 may send to the bridge 630 another VDP request that indicates the MAC/VLAN ID pair(s) to be retained. Upon receiving the VDP request, the bridge 630 may determine that a MAC/VLAN ID pair already existing in an association table for the bridge 630 is not included in the newly received VDP request and hence interpret the VDP request as an instruction to remove the entry for this MAC/VLAN ID pair. At step h, the bridge 630 may return to the server 620 another VDP response that indicates a successful association and the retained MAC/VLAN ID pair(s). The server 620 may determine that the MAC/VLAN ID pair already exists in a local association table for the server 620 and hence interpret the successful VDP response as an acknowledgement of removal of the entry for this MAC/VLAN ID pair, which may not be anymore available for the VM manager 610. The steps f, g, and h may also be used in any of the methods 300, 400, and 500 above to remove a MAC/VLAN or VLAN ID pair.

In the methods above, the VM manager may not need to change or replace a VLAN ID for a VLAN associated with a VM or server as long as no changes are made to the corresponding VSI Type definition. If the VSI Type definition changes or the VLAN ID needs to be changed or replaced, then the bridge may be triggered (e.g., by the network or a network administrator) to initiate a VDP response to the server to re-provision (e.g., change or replace) the VLAN ID association at the server. The methods above may be implemented to handle the single MAC/single VLAN case, where the VDP associations may indicate a single MAC/VLAN pair. In this case, the bridge may send a corresponding VLAN ID to the server or station, e.g., upon request or to change a VLAN ID. The server may send a refresh VDP request to the bridge, which upon receiving the request may return a different VLAN ID from the VLAN ID sent in previous VDP responses. The server may then recognize that a different VLAN ID has been provided in the VDP response from the bridge and adopt the new VLAN ID value.

The methods may also be implemented to handle a single MAC and multiple VLANs, where the same MAC may be associated with a list of VLANs. In this case, the bridge may also send one or more VLAN IDs to the server or station as described above. In some scenarios, the methods above may handle the multiple MACs/multiple VLANs case, where one or more MACs may be associated with one or more VLANs. For example, the system administrator may decide on the valid combinations of MACs and VLANs. In this case, the station may indicate the MACs/VLAN names to the bridge, such as using the method 600.

Figure 7:
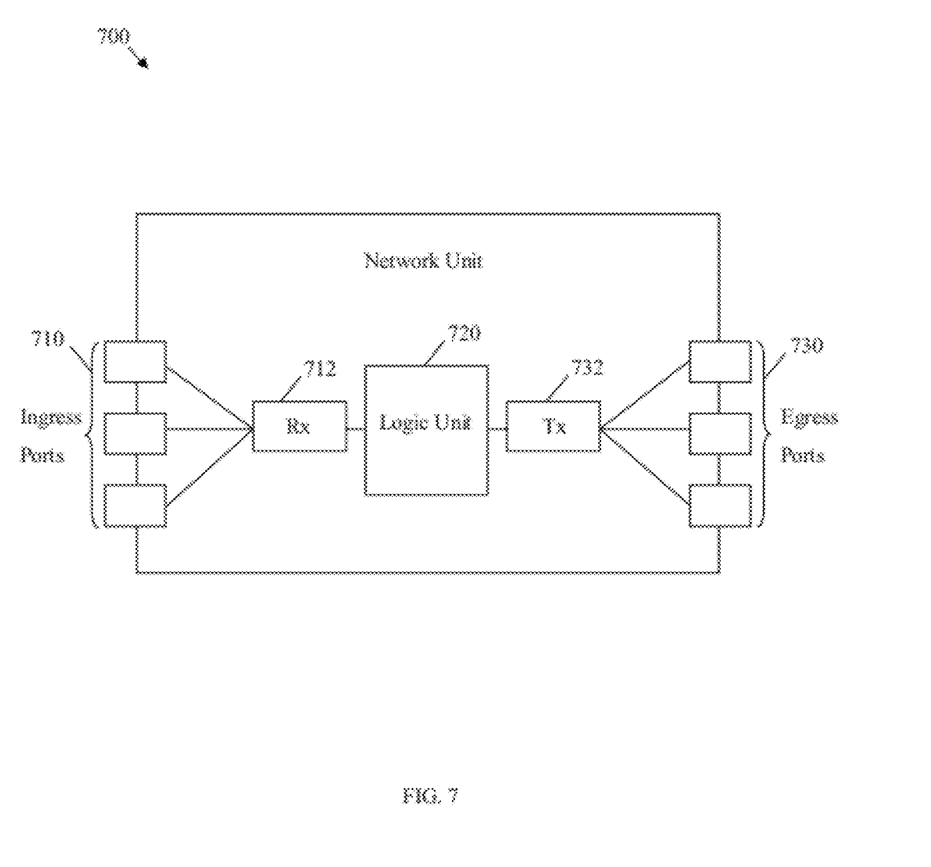
FIG. 7 is a schematic diagram of an embodiment of a network unit.

FIG. 7 illustrates an embodiment of a network unit 700, which may be any device that transports and processes data through a network, e.g., the DC network 100. For instance, the network unit may correspond to or may be located at the server 320 or the bridge 330. The network unit 700 may comprise one or more ingress ports or units 710 coupled to a receiver (Rx) 712 for receiving signals and frames/data from other network components. The network unit 700 may comprise a logic unit 720 to determine which network components to send data to. The logic unit 720 may be implemented using hardware, software, or both. The network unit 700 may also comprise one or more egress ports or units 730 coupled to a transmitter (Tx) 732 for transmitting signals and frames/data to the other network components. The receiver 712, logic unit 720, and transmitter 732 may also implement or support the methods 300 to 600 above. The components of the network unit 700 may be arranged as shown in FIG. 7.

Figure 8:
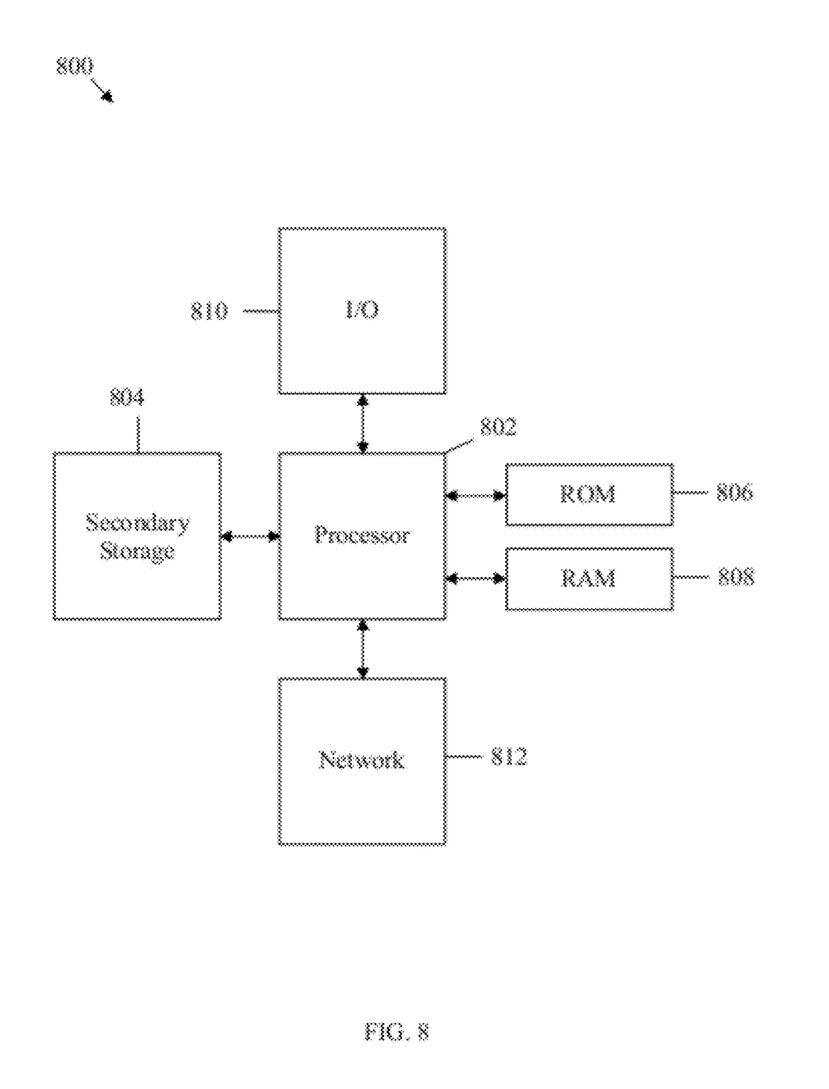
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random-access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to second storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    an edge virtual bridging (EVB) station operatively coupled to an EVB bridge,
    wherein the EVB station comprises a virtual station interface (VSI), and
    wherein the EVB station is configured to:
        send to the EVB bridge a VSI discovery and configuration protocol (VDP) request comprising a filter information (info) field that specifies a null virtual local area network (VLAN) identifier (VID) and a VSI Type identifier (ID) that indicates a VSI type for the VSI, and
        receive a VDP response comprising one or more VID values associated with the VSI.

2. The apparatus of claim 1, wherein the null VID in the filter info field indicates that the VID values associated with the VSI are supplied by the EVB bridge.

3. The apparatus of claim 1, wherein the filter info field within the VDP request comprises a Group ID that identifies a VLAN that corresponds to a VID, wherein at least one of the VID values within the VDP response represents the VLAN corresponding to the VID, and wherein the filter info field has a Group ID/VID filter format.

4. The apparatus of claim 1, wherein the filter info field comprises a number of entries field that specifies a number of VIDs within the filter info field, and wherein the VDP request further comprises a VSI Type Version field that identifies the version of the VSI type.

5. The apparatus of claim 1, wherein the filter info field has a Group ID/Media Access Control (MAC)/VID filter info format that indicates that the filter info field specifies a sequence of Group ID/MAC/VID values associated with the VSI.

6. The apparatus of claim 1, wherein the filter info field comprises a set of one or more Group ID/VID values associated with the VSI.

7. An apparatus comprising:
    an edge virtual bridging (EVB) bridge; and an EVB station operatively coupled to the EVB bridge,
wherein the EVB station is configured to send to the EVB bridge a virtual station interface (VSI) discovery and configuration protocol (VDP) request comprising a filter information (info) field that does not specify a virtual local area network (VLAN) identifier (VID) and an identifier field, and
wherein the EVB bridge is configured to:
receive the VDP request;
obtain a VID using information provided by the identifier field; and
send the VID to the EVB station in a second filter info field in a VDP response to the VDP request,
wherein the EVB station comprises a VSI, wherein the identifier field is a VSI Type identifier (ID) that indicates a VSI type for the VSI, and wherein the EVB station is further configured to receive the VDP response and assign the allocated VID to the VSI.

8. An apparatus comprising:
an edge virtual bridging (EVB) bridge; and
an EVB station coupled to the EVB bridge,
wherein the EVB station is configured to send to the EVB bridge a virtual station interface (VSI) discovery and configuration protocol (VDP) request comprising a filter information (info) field without specifying a virtual local area network (VLAN) identifier (ID),
wherein the EVB bridge is configured to send a VLAN ID (VID) to the EVB station in a second filter info field in a VDP response to the VDP request, and
wherein each of the filter info field and the second filter info field comprises a set of one or more Media Access Control (MAC)/VID values.

9. An apparatus comprising:
an edge virtual bridging (EVB) bridge; and
an EVB station coupled to the EVB bridge,
wherein the EVB station is configured to send to the EVB bridge a virtual station interface (VSI) discovery and configuration protocol (VDP) request comprising a filter information (info) field without specifying a virtual local area network (VLAN) identifier (ID),
wherein the EVB bridge is configured to send a VLAN ID (VID) to the EVB station in a second filter info field in a VDP response to the VDP request, and
wherein the VDP request indicates a plurality of VLANs for a single Media Access Control (MAC) Address.

10. An apparatus comprising:
an edge virtual bridging (EVB) bridge; and
an EVB station coupled to the EVB bridge,
wherein the EVB station is configured to send to the EVB bridge a virtual station interface (VSI) discovery and configuration protocol (VDP) request comprising a filter information (info) field without specifying a virtual local area network (VLAN) identifier (ID),
wherein the EVB bridge is configured to send a VLAN ID (VID) to the EVB station in a second filter info field in a VDP response to the VDP request, and
wherein the VDP request indicates a plurality of VLANs for a plurality of Media Access Control Addresses.

11. A method implemented by at least one network component comprising:
sending from a virtual station a virtual station interface (VSI) discovery and configuration protocol (VDP) request that comprises a virtual local area network (VLAN) field without specifying a VLAN identifier (ID) to a bridge coupled to the virtual station via a VSI;
receiving at the virtual station a VDP response that comprises a VLAN ID that is mapped at the bridge to the VLAN field; and
assigning the VLAN ID received in the VDP response to the VSI,
wherein at least one of the virtual station and the bridge store an association between the VLAN ID and VSI, and
wherein the VDP request comprises a VSI Type ID field that holds information corresponding to the VSI type and a filter information field that comprises a VLAN ID field.

12. A method implemented by at least one network corn orient comprising:
sending from a virtual station a virtual station interface (VSI) discovery and configuration protocol (VDP) request that comprises a virtual local area network (VLAN) field without specifying a VLAN identifier (ID) to a bridge coupled to the virtual station via a VSI;
receiving at the virtual station a VDP response that comprises a VLAN ID that is mapped at the bridge to the VLAN field;
assigning the VLAN ID received in the VDP response to the VSI; and
obtaining a VSI type and a VSI ID for a VSI located on the virtual station, wherein the VSI type indicates the type of traffic associated with the VSI,
wherein the VSI ID identifies the VSI, and
wherein the VDP request is sent to change a VLAN ID associated with the VSI.

13. A method implemented by at least one network component comprising:
sending from a virtual station interface (VSI) discovery and configuration protocol (VDP) request that comprises a virtual local area network (VLAN) field to a bridge coupled to the virtual station via a VSI; and
receiving at the virtual station a VDP response that comprises a VLAN identifier (ID) that is mapped at the bridge to the VLAN field,
wherein the VDP request is sent to change a VLAN ID associated with the VSI, and
wherein the bridge is configured to send a VDP response to the virtual station to change a VLAN ID at the virtual station.

14. A method implemented by at least one network component comprising:
sending from a virtual station interface (VSI) discovery and configuration protocol (VDP) request that comprises a virtual local area network (VLAN) field to a bridge coupled to the virtual station via a VSI;
receiving at the virtual station a VDP response that comprises a VLAN identifier (ID) that is mapped at the bridge to the VLAN field;
sending from the virtual station to the bridge a second VDP request that comprises one or more media access control (MAC) Addresses and one or more associated VLAN fields for one or more existing VLAN associations at the bridge to indicate to the bridge to delete any other existing VLAN associations that are not included in the second VDP request; and
receiving at the virtual station a second VDP response that indicates an acknowledgement of successful removal of the VLAN associations at the bridge.

15. A network bridge comprising:
a receiver configured to receive from a network server a virtual station interface (VSI) discovery and configuration protocol (VDP) request message that comprises an identifier field and a virtual local area network (VLAN) identifier (ID) field;

a transmitter configured to transmit to the network server a VLAN ID in a VDP response message in response to the VDP request message; and a logic unit configured to retrieve the VLAN ID using an ID value within the identifier field in the VDP request message, wherein the ID value in the VDP request message is a VSI Type (VTID) that specifies the type of data associated with a VSI located at the network server, and wherein the VLAN ID field within the VDP request message specifies a null VLAN ID.

16. The network bridge of claim 15 further comprises a port, wherein the VDP response is used to associate the VSI to the port.

17. The network bridge of claim 15, wherein a second ID value in the VDP request message is a VLAN name, and wherein the logical unit is further configured to map the second ID value to the VLAN ID using a database.

18. A method implemented by at least one network component comprising:

receiving at a bridge from a virtual station coupled to the bridge via a virtual station interface (VSI) discovery and configuration protocol (VDP) request that comprises a virtual local area network (VLAN) field; and sending to the virtual station, a VDP response that comprises a VLAN identifier (ID) that is mapped at the bridge to the VLAN field, wherein the VDP request is sent to change a VLAN ID associated with the VSI, and wherein the bridge is configured send the VDP response to the virtual station to change a VLAN ID at the virtual station.

19. A method implemented by a bridge, the method comprising:

receiving a virtual station interface (VSI) discovery and configuration protocol (VDP) request comprising a null virtual local area network (VLAN) identifier (VID);

obtaining a VID using information within the VDP request when a filter information (info) field within the VDP request specifies the null VID; and transmitting a VDP response comprising a second filter info field that comprises a set of VID values associated with a VSI, wherein the null VID indicates that the set of VID values associated with the VSI is supplied by the bridge.

20. The method of claim 19, further comprising obtaining the set of VID values from a VSI type whose identity is specified by a VSI type information within the VDP request.

21. The method of claim 19, wherein the filter info field within the VDP request comprises a Group identifier (ID) that identifies a VLAN that corresponds to a VID, and wherein the set of VID values correspond to the VID.

22. The method of claim 21, further comprising mapping the Group ID to the set of VIDs and maintaining the mapping of the Group ID and the set of VIDs, wherein the set of VID values are local VID values, and wherein the VDP response further comprises the Group ID.

23. The method of claim 19, further comprising obtaining the VID from a database and storing the association of the VID and at least one of the following that correspond to the VSI: a VSI type, a VSI Type Version, and a media access control (MAC) address.

24. The method of claim 19, wherein the information within the VDP request is a service name associated with the VSI, and wherein the service name is used to obtain the VID.

25. The method of claim 19, wherein the information within the VDP request is a VLAN name associated with the VSI, and wherein the VLAN name is used to obtain the VID.

26. The method of claim 19, wherein the VDP response indicates a successful association of the VID and at least one of the following that correspond to the VSI: a VSI type, a VSI Type Version, and a media access control (MAC) address.

* * * * *

UNITED STATES PATENT AND TRADEMARK OFFICE
CERTIFICATE OF CORRECTION

Page 1 of 3

PATENT NO. : 8,718,071 B2
APPLICATION NO. : 13/229163
DATED : May 6, 2014
INVENTOR(S) : Yizhou Li et al.

It is certified that error appears in the above-identified patent and that said Letters Patent is hereby corrected as shown below:

In the claims:

Column 11, lines 48-60, claim 10, should read as:
"10. An apparatus comprising:
an edge virtual bridging (EVB) bridge; and
an EVB station coupled to the EVB bridge,
wherein the EVB station is configured to send to the EVB bridge a virtual station interface (VSI)
  discovery and configuration protocol (VDP) request comprising a filter information (info)
  field without specifying a virtual local area network (VLAN) identifier (ID),
wherein the EVB bridge is configured to send a VLAN ID (VID) to the EVB station in a second filter
  info field in a VDP response to the VDP request, and
wherein the VDP request indicates a plurality of VLANs for a plurality of Media Access Control
  (MAC) Addresses."

Column 12, lines 13-30, claim 12, should read as:
"12. A method implemented by at least one network component comprising:
  sending from a virtual station a virtual station interface (VSI) discovery and configuration
protocol (VDP) request that comprises a virtual local area network (VLAN) field without specifying a
VLAN identifier (ID) to a bridge coupled to the virtual station via a VSI;
  receiving at the virtual station a VDP response that comprises the VLAN ID that is mapped at
the bridge to the VLAN field;
  assigning the VLAN ID received in the VDP response to the VSI; and
  obtaining a VSI type and a VSI ID for the VSI located on the virtual station, wherein the VSI
type indicates the type of traffic associated with the VSI,
    wherein the VSI ID identifies the VSI, and
    wherein the VDP request is sent to change the VLAN ID associated with the VSI."

Signed and Sealed this
Twenty-seventh Day of January, 2015

Michelle K. Lee
*Deputy Director of the United States Patent and Trademark Office*

CERTIFICATE OF CORRECTION (continued)
U.S. Pat. No. 8,718,071 B2

In the claims:

Column 12, lines 32-45, claim 13, should read as:
"13. A method implemented by at least one network component comprising:
sending from a virtual station interface (VSI) discovery and configuration protocol (VDP) request that comprises a virtual local area network (VLAN) field to a bridge coupled to the virtual station via a VSI; and
receiving at the virtual station a VDP response that comprises a VLAN identifier (ID) that is mapped at the bridge to the VLAN field,
wherein the VDP request is sent to change the VLAN ID associated with the VSI, and
wherein the bridge is configured to send the VDP response to the virtual station to change the VLAN ID at the virtual station."

Column 12, lines 46-64, claim 14, should read as:
"14. A method implemented by at least one network component comprising:
sending from a virtual station interface (VSI) discovery and configuration protocol (VDP) request that comprises a virtual local area network (VLAN) field to a bridge coupled to the virtual station via a VSI;
receiving at the virtual station a VDP response that comprises a VLAN identifier (ID) that is mapped at the bridge to the VLAN field;
sending from the virtual station to the bridge a second VDP request that comprises one or more Media Access Control (MAC) Addresses and one or more associated VLAN fields for one or more existing VLAN associations at the bridge to indicate to the bridge to delete any other existing VLAN associations that are not included in the second VDP request; and
receiving at the virtual station a second VDP response that indicates an acknowledgement of successful removal of the VLAN associations at the bridge."

Column 13, lines 19-22, claim 17, should read as:
"17. The network bridge of claim 15, wherein a second ID value in the VDP request message is a VLAN name, and wherein the logic unit is further configured to map the second ID value to the VLAN ID using a database."

Column 13, lines 23-36, claim 18, should read as:
"18. A method implemented by at least one network component comprising:
receiving at a bridge from a virtual station coupled to the bridge via a virtual station interface (VSI) discovery and configuration protocol (VDP) request that comprises a virtual local area network (VLAN) field; and
sending to the virtual station, a VDP response that comprises a VLAN identifier (ID) that is mapped at the bridge to the VLAN field,
wherein the VDP request is sent to change the VLAN ID associated with the VSI, and
wherein the bridge is configured send the VDP response to the virtual station to change the VLAN ID at the virtual station."

CERTIFICATE OF CORRECTION (continued)
U.S. Pat. No. 8,718,071 B2

In the claims:

Column 13, lines 37-38 through Column 14, lines 1-11, claim 19, should read as:
"19. A method implemented by a bridge, the method comprising:
receiving a virtual station interface (VSI) discovery and configuration protocol (VDP) request comprising a null virtual local area network (VLAN) identifier (VID);
obtaining a VID using information within the VDP request when a filter information (info) field within the VDP request specifies the null VLAN VID; and
transmitting a VDP response comprising a second filter info field that comprises a set of VID values associated with a VSI,
wherein the null VLAN VID indicates that the set of VID values associated with the VSI is supplied by the bridge."

Column 14, lines 23-27, claim 23, should read as:
"23. The method of claim 19, further comprising obtaining the VID from a database and storing the association of the VID and at least one of the following that correspond to the VSI: a VSI type, a VSI Type Version, and a Media Access Control (MAC) Address."

Column 14, lines 34-37, claim 26, should read as:
"26. The method of claim 19, wherein the VDP response indicates a successful association of the VID and at least one of the following that correspond to the VSI: a VSI type, a VSI Type Version, and a Media Access Control (MAC) Address."